Jan. 4, 1944.                G. E. DUNN                 2,338,169
                        UNIVERSAL JOINT SEAL
                        Filed June 5, 1941
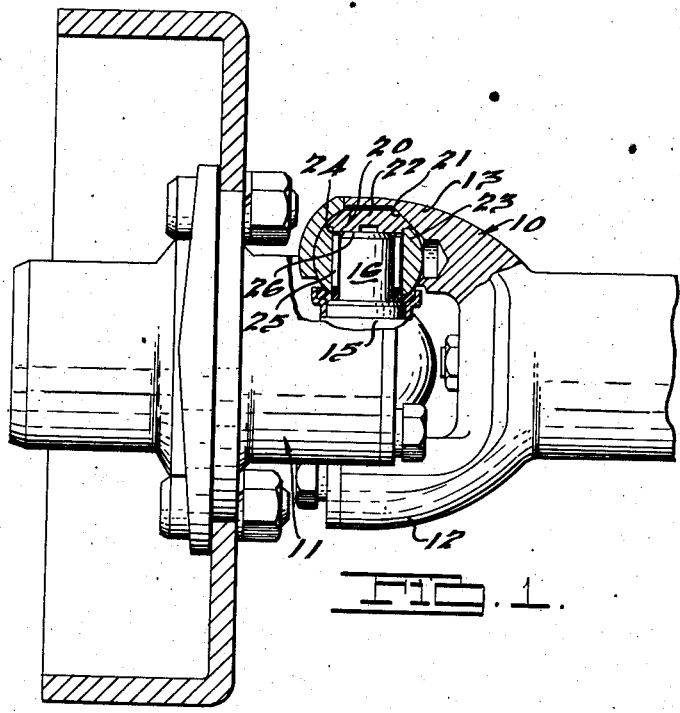
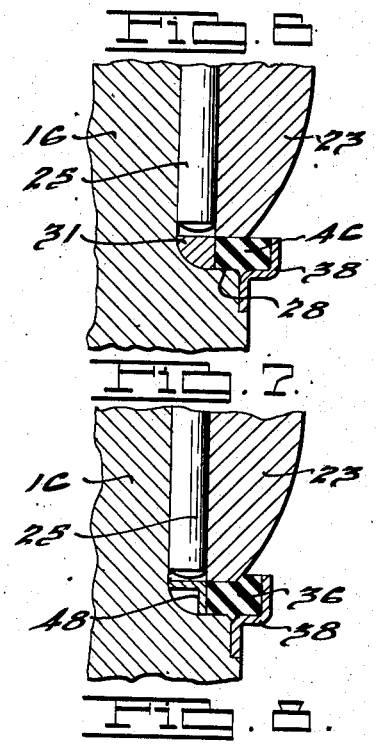
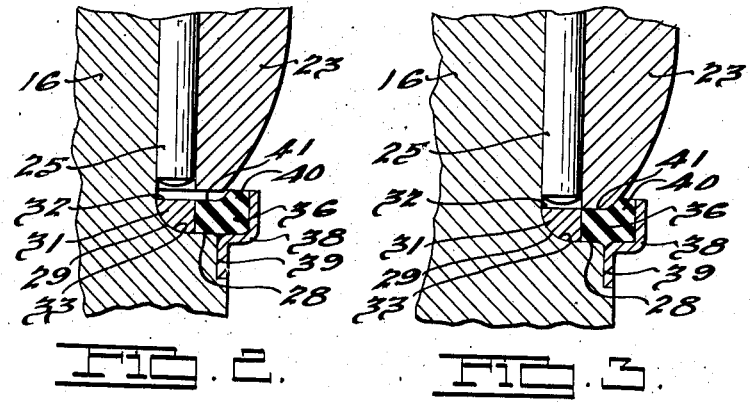
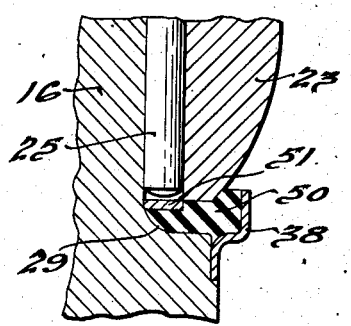
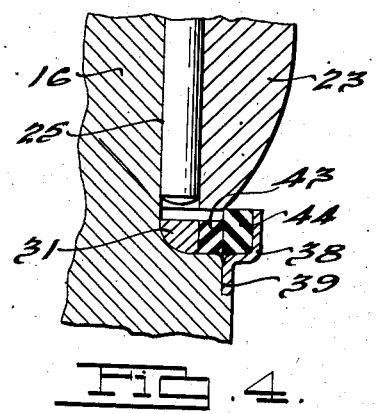
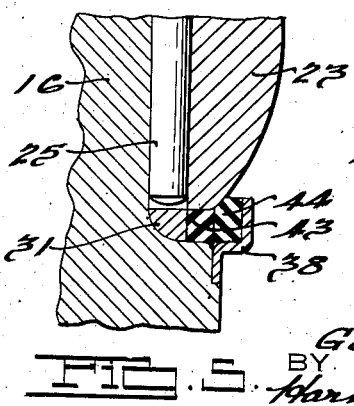
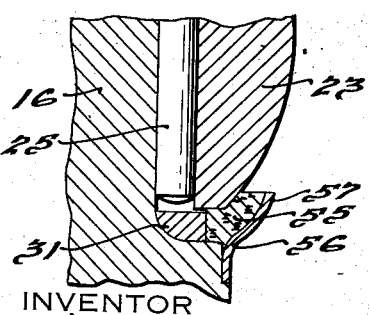
INVENTOR
*George E. Dunn.*
BY
*Harness, Dickey & Pierce*
ATTORNEYS Patented Jan. 4, 1944

2,338,169

UNITED STATES PATENT OFFICE 2,338,169

UNIVERSAL JOINT SEAL

George E. Dunn, Dearborn, Mich., assignor to Universal Products Company Incorporated, Dearborn, Mich., a corporation of Delaware Application June 5, 1941, Serial No. 396,647

5 Claims. (Cl. 64—17)

The invention relates generally to universal joints and it has particular relation to sealing arrangements and structures for sealing the trunnion bearing assemblies.

In certain respects this application is related to my copending applications for patent, Serial No. 353,016, filed August 17, 1940 (now Patent No. 2,270,279, issued January 20, 1942), and Serial No. 383,744, filed March 17, 1941 (now Patent No. 2,270,280, issued Jan. 20, 1942), and constitutes a continuation-in-part of such applications for patent. Also, the application embodies certain subject-matter disclosed in my copending application for patent, Serial No. 392,449, filed May 8, 1941.

One of the objects of the present invention is to provide an improved sealing means for sealing trunnion bearing assemblies in universal joints, to the end that lubricant will be more efficiently sealed within the bearing and that dirt or other foreign matter will be more efficiently prevented from gaining ingress to the bearing assembly.

Another object of the invention is to provide an improved trunnion bearing assembly and sealing means which includes means for preventing the rollers from becoming misaligned or bent in the region of the seal.

Other objects of the invention will become apparent from the following specification, from the drawing relating thereto, and from the claims hereinafter set forth.

For a better understanding of the invention, reference may be had to the drawing wherein:

Figure 1 is a side elevational view partly in section of a universal joint and sealing means constructed in accordance with one form of the invention;

Figs. 2 and 3 illustrate in greater detail the particular trunnion bearing assembly and sealing means shown in Fig. 1;

Figs. 4 to 9, inclusive, are views similar to Fig. 2, but illustrate other forms of the invention.

Referring to Fig. 1, the universal joint illustrated corresponds generally to that disclosed in my copending application for patent, Serial No. 383,744 (now Patent No. 2,270,280, issued Jan. 20, 1942), and comprises a pair of yokes 10 and 11, each of which has a pair of arms 12 and 13. A cross 15 having four trunnions 16 arranged in 90° spaced relation is connected to the two yokes and each trunnion projects into a ball member 20 which is located in a recess 21 in the yoke arm corresponding thereto.

The ball member includes two parts 22 and 23 interfitted as indicated at 24 and such ball members jointly provide an exterior frusto-spherical surface. The trunnion 16 projects into the ball member and between the adjacent cylindrical surfaces of the trunnion and ball member an annular series of smaller cylindrical rollers 25 is provided. Approximate contact of the ball parts 22 with the ends of the trunnions, as indicated at 26, serves to locate the cross and it will be understood that with the balls centered within the recesses 21, both the cross and balls may be centered with respect to the axis of the joint.

Referring now to Fig. 2, the base of the trunnion is enlarged to provide a radial shoulder 28 and the cylindrical trunnion surface merges with this shoulder through a curved or concave corner surface 29. Provision of this curved corner surface is of importance in that it avoids a weak sector which might fail more rapidly under stress, and thus the strength of the cross is increased. In order to prevent the rollers 25 from moving inwardly into contact with the curved corner surface 29 during assembly, or perhaps at other times, a hard metal washer 31 is provided at the inner ends of the rollers. This washer has a radial face 32 next to the rollers so that if the rollers should move inwardly and contact the radial face, they will not be deflected outwardly as might occur if they contacted the curved corner surface 29. Also, the washer has a curved corner surface 33, fitting the curved corner surface 29.

Outwardly of the washer 31 and between the radial shoulder 28 and the end face of the ball member 23, a rubber sealing ring 36 is provided which is retained in position by a sheet metal ferrule 38 having a press fit engagement with the trunnion as indicated at 39. The rubber ring generally is of L shape and has a portion 40 adapted to engage the spherical surface of the ball and a radial surface 41 adapted to contact the end face of the ball. When the ball is moved from the position shown in Fig. 2 to its final position shown in Fig. 3, the portion 40 contacts the ball first, that is, ahead of the radial portion 41 and hence the portion 40 is deformed to a greater extent to obtain substantial surface contact, and will have strong pressure engagement with the spherical surface of the ball. With the rubber located in a generally confined condition, it will be apparent that the pressure on the rubber will meet a somewhat greater resistance to deformation although the rubber will flow as necessary into available space to allow the ball to be moved to its operative position as shown by Fig. 3. Naturally, the rubber will tend to return to its normal condition and thus forcefully and positively maintain sealing contact with the surfaces with which it is in contact. A durable seal thus will be assured even through prolonged use of the joint since the compressed rubber will compensate for wear.

The seal shown by Fig. 4 is similar to that shown by Fig. 2 with the exception that a rubber ring 43 of rectangular shape contacts the end face of the ball while a separate ring 44 has a corner which is adapted to contact the spherical surface of the ball. In assembling the parts, the rubber will be compressed and, as a result, some rubber in the ring 44 will flow or deform into substantial area contact with the spherical surface as shown in Fig. 5. It might be added that the ring 44 is designed to contact the ball ahead of ring 43 so as to accentuate the sealing contact with the spherical surface similarly as mentioned with respect to Figs. 2 and 3.

In both of the seals described, the rubber preferably is of synthetic character and neoprene has been found satisfactory. A characteristic of this synthetic rubber is its resistance to oil or grease and thus it will not normally deteriorate when used in the joint. It will be understood too that the rubber should be flexible and deformable in a suitable manner.

The seal shown by Fig. 6 includes a rubber ring 46 between the shoulder 28 and the end face of the ball and which does not overlap the spherical surface of the ball except perhaps a slight amount due to flow of the rubber when compressed between said shoulder and end face. It may be noted in this case that the ferrule 38 does not overlap the ball.

The seal shown by Fig. 7 has a rubber ring like that shown by Fig. 3, but the metal ring in this case is angular in cross-section as indicated at 48.

In Fig. 8, a rubber sealing ring 50 is employed which contacts the end face and spherical surface of the ball as in the structure shown by Fig. 3 and which may also extend to the trunnion curved surface. The metal ring 51 in this case is disposed above the rubber and in a recess therefor and may also be held against downward movement by the increasing radius of the corner surface 29.

In the construction shown by Fig. 9, a sealing ring 55 is provided which is retained in position by a ferrule 56 press fitted on the base of the trunnion and which has an outer flange 57 generally frusto-spherical in contour. The ring may be constructed of suitable sealing material, such as cork, and may have an original, frusto-spherical shape corresponding to that shown. Thus, its inner surface will contact the washer 31 which in this instance extends under the end face of the ball, while its other surfaces contact the spherical surface of the ball and the inner surfaces of the ferrule. Large sealing contact is obtained in this structure and by having the sealing ring surfaces parallel to the ball surface, and ferrule, an efficient sealing action is obtained during oscillatory movement of the ball with respect to the ferrule.

Although more than one form of the invention has been described and illustrated in detail, it will be apparent to those skilled in the art that various modifications may be made without departing from the scope of the appended claims.

What is claimed is:

1. In a universal joint of the four trunnion type, a bearing assembly comprising a trunnion having an enlarged base, a ball shape bearing sleeve around the trunnion, small cylindrical rollers between the trunnion surface and the sleeve, an annular ferrule on the trunnion base and having a sleeve portion spaced radially from the trunnion surface and from the outer spherical ball surface at the end of the bearing sleeve, and a resilient, rubber-like sealing ring retained within and by the sleeve portion of the ferrule and having a compressed portion in sealing contact with the outer spherical surface of the ball, said portion of the ring being characterized by the fact it is compressed and distorted from substantially an initially sharp corner edge engagement with the spherical surface.

2. In a universal joint of the four trunnion type, a bearing assembly comprising a trunnion having an enlarged base, a ball shape bearing sleeve around the trunnion, small cylindrical rollers between the trunnion surface and the sleeve, an annular ferrule on the trunnion base and having a sleeve portion spaced radially from the trunnion surface and from the outer spherical ball surface at the end of the bearing sleeve, and resilient rubber-like sealing ring means retained within and by the sleeve portion of the ferrule and having a portion in contact with the end face of the ball and a compressed portion in sealing contact with the outer spherical surface of the ball, said latter portion of the ring being characterized by the fact it is compressed and distorted from an initially substantially sharp corner edge engagement with the spherical surface.

3. In a universal joint of the four trunnion type, a bearing assembly comprising a trunnion having a radially extending base or shoulder and a curved surface joining the trunnion and shoulder, a bearing sleeve around the trunnion, small cylindrical rollers between the trunnion surface and the sleeve, a washer on the trunnion having a curved side fitting the aforesaid curved surface and having a radial face next to the ends of the rollers and extending radially past the centers thereof, an annular ferrule on the base of the trunnion and having a sleeve portion spaced radially from the trunnion surface and from the washer, and a resilient rubber-like sealing ring disposed between the washer and sleeve portion of the ferrule and being compressed between the latter and the outer surface of the bearing sleeve.

4. In a universal joint of the four trunnion type, a bearing assembly comprising a trunnion having an enlarged base, a ball shape bearing sleeve around the trunnion, small cylindrical rollers between the trunnion surface and the sleeve, an annular ferrule on the trunnion base and having a sleeve portion spaced radially from the trunnion surface and from the outer spherical ball surface at the end of the bearing sleeve, and resilient rubber-like sealing ring means retained within and by the sleeve portion of the ferrule and having a portion in contact with the end face of the ball and a compressed portion in sealing contact with the outer spherical surface of the ball, that portion of the sealing ring engaging the spherical surface being distorted from its original condition substantially more and having greater pressure engagement with such surface than the distortion of the other portion and pressure engagement thereof with the end face.

5. In a universal joint of the four trunnion type, a bearing assembly comprising a trunnion having a radially extending base or shoulder and a curved surface joining the trunnion and shoulder, a bearing sleeve around the trunnion, small cylindrical rollers between the trunnion surface and the sleeve, a washer on the inner end of the trunnion and seated in overlapping relation to the curved surface, and having a radial face next to the ends of the rollers and extending radially past the centers thereof, an annular ferrule on the base of the trunnion and having a sleeve portion spaced radially from the trunnion surface and from the washer, and a resilient rubber-like sealing ring disposed between the washer and sleeve portion of the ferrule and being compressed between the latter and the outer surface of the bearing sleeve.

GEORGE E. DUNN.